United States Patent [19]

Bhat

[11] Patent Number: 5,792,811
[45] Date of Patent: Aug. 11, 1998

[54] PRIMER COMPOSITION FOR IMPROVING THE BONDING OF A URETHANE ADHESIVE

[75] Inventor: Shailesh S. Bhat, Troy, Mich.

[73] Assignee: The Dow Chemical Company, Midland, Mich.

[21] Appl. No.: 777,145

[22] Filed: Dec. 30, 1996

[51] Int. Cl.$^6$ .................... C08J 3/00; C08K 3/20; C08L 75/00; C08G 18/08
[52] U.S. Cl. .................. 524/590; 514/394; 514/539; 514/589; 528/55
[58] Field of Search .................. 524/589, 590, 524/539, 394; 528/55

[56] References Cited

U.S. PATENT DOCUMENTS

| | | | |
|---|---|---|---|
| 4,525,511 | 6/1985 | Kirby | 524/158 |
| 4,643,794 | 2/1987 | Saracsan | 156/310 |
| 5,115,086 | 5/1992 | Hsieh | 528/272 |
| 5,238,993 | 8/1993 | Hsieh | 524/726 |
| 5,573,812 | 11/1996 | Moy | 427/333 |

Primary Examiner—Patrick D. Niland
Attorney, Agent, or Firm—Jill Blasy; Norman L Sims

[57] ABSTRACT

The invention is a primer composition, comprising
  (a) a polyester resin of a carboxylic acid and a glycol;
  (b) a polymethylene poly(phenyl isocyanate), diphenylmethane diisocyanate or a mixture thereof; and
  (c) bismuth octoate
in a volatile solvent.

The primer composition of the invention advantageously provides improved adhesion characteristics of metal-to-glass bonding when used to prime substrate, particularly painted metal substrate before the application of a urethane adhesive. The primer composition of the invention may also be used to prime other metal and glass surfaces for use with various adhesives.

15 Claims, No Drawings

5,792,811

PRIMER COMPOSITION FOR IMPROVING THE BONDING OF A URETHANE ADHESIVE

BACKGROUND OF THE INVENTION

The invention relates to a primer composition for priming a substrate surface to decrease the cure time and increase the adhesion of a sealant composition to the surface of the substrate. Preferably, the invention relates to a primer composition for priming a coated or painted substrate surface to decrease the cure time and increase the adhesion of a sealant composition to the surface of the coated substrate.

Urethane sealants and adhesives are known to provide high tensile strengths and tear strengths when used to bond materials. Such sealants and adhesives are especially suitable for use in automobile manufacture for the bonding of a windshield to an auto body, wherein the bonding imparts additional structural integrity to the automobile body. However, some urethane sealants do not bond glass to painted metal sufficiently without the use of a primer composition to prime the metal substrate.

In the automotive aftermarket replacement industry, glass is often bound into automobiles using urethane sealants. The market demands faster curing adhesives which allow even faster drive away times. If the adhesive cures too rapidly, then the window installer loses the necessary time to install and properly place the glass into the frame before the adhesive becomes too intractable to work with. Working time is defined as the period from application of adhesive until the adhesive becomes too intractable to work with.

Primers for use in improving the bonding of glass to painted surfaces are known and described in U.S. Pat. No. 4,525,511, which describes a primer comprising a film-forming resin and a strong acid. U.S. Pat. No. 4,643,794 describes a primer for bonding to both glass and metal surfaces which comprises 10 to 20 parts polyester resin, 4 to 5 parts polyisocyanate cross-linking agent, 3 to 9 parts carbon black, and 66 to 83 parts volatile solvent. Such primers are adapted for use on both glass and metal substrates; however, it is often preferable to use different primers for priming glass and metal substrates which have optimum adhesion characteristics for their particular use in order to meet stringent federal motor vehicle safety standards when such a primer is used to bond windshields in automobiles. The primer used also affects the cure time of the adhesive.

It would be desirable to develop a primer composition which will decrease the cure time and improve the adhesion characteristics of a sealant to a substrate. It would be desirable to develop a primer composition which will decrease the cure time and improve the adhesion characteristics of a sealant to coated or painted substrates.

SUMMARY OF THE INVENTION

The invention is a primer composition, comprising
(a) a polyester resin of a carboxylic acid and a glycol;
(b) a polymethylene poly(phenyl isocyanate), diphenylmethane diisocyanate or a mixture thereof; and
(c) bismuth octoate
in a volatile solvent.

The invention further comprises a process for binding glass to a substrate(s), comprising
(a) priming the substrate(s) with a primer composition of the invention;
(b) contacting an adhesive composition with the substrate; and
(c) contacting the glass and the substrate together along the portion of the substrate(s) to which the adhesive composition has been applied.

The catalyst-containing primer composition of the invention advantageously provides decreased cure time and improved adhesion characteristics of sealants for metal-to-glass bonding when used to prime a substrate, particularly a painted metal substrate before the application of a urethane adhesive. The primer composition of the invention may also be used to prime other metal and glass surfaces for use with various adhesives. The catalyst selectively catalyzes the isocyanate polyol reaction leading to a faster cure of the adhesive and link up to the primed surface.

DETAILED DESCRIPTION OF THE INVENTION

The primer composition of the invention is a liquid mixture, which is sufficiently dense to permit application of the primer composition to the surface of a substrate. Before application, the primer composition preferably has a density of about 7.0 lb/gal (0.84 kg/L) or greater, more preferably about 8.0 lb/gal (0.96 kg/L) or greater, and most preferably about 9.0 lb/gal (1.1 kg/L) or greater. After application, the primer composition forms a tenacious coating upon solvent evaporation and completely cures upon exposure to atmospheric moisture.

The polyester resin of a carboxylic acid and a glycol component of the primer composition (hereinafter "polyester resin") is a polymer of a carboxylic acid and a glycol. The polyester resin is preferably a polymer of at least one aromatic dicarboxylic acid or alkyl ester thereof, and at least one glycol compound. Preferred aromatic dicarboxylic acids include 1,3-benzenedicarboxylic acid and 1,4-benzenedicarboxylic acid. Preferred glycols include 1,2-ethanediol. More preferred is Vitel™ PE-200, a polyester resin with a molecular weight of about 20,000, sold by the Goodyear Tire and Rubber Company. The preparation of these polyester resins is described in U.S. Pat. Nos. 3,459,584, 4,020,049 and 4,418,183, which are hereby incorporated by reference in their entirety.

The polyester resin preferably has a weight average molecular weight of about 15,000 or greater, and more preferably about 17,000 or greater. The polyester resin preferably has a weight average molecular weight of about 30,000 or less, and more preferably about 25,000 or less. The polyester resin has a glass transition temperature which is preferably about 50° C. or greater, more preferably about 57° C. or greater, and most preferably about 65° C. or greater. The polyester resin has a glass transition temperature which is preferably about 80° C. or less, more preferably about 75° C. or less, and most preferably about 70° C. or less.

The polymethylene poly(phenyl isocyanate), diphenylmethane diisocyanate, or mixture thereof (hereinafter "polyisocyanate") is a polyisocyanate which preferably has an NCO equivalent weight of about 130 or greater, more preferably about 133 or greater, and even more preferably about 140 or greater. The polymethylene poly(phenyl isocyanate), diphenylmethane diisocyanate, or mixture thereof (hereinafter "polyisocyanate") is a polyisocyanate which preferably has an NCO equivalent weight of about 500 or less, more preferably about 300 or less, and even more preferably about 150 or less. The average number of isocyanate groups per molecule of polyisocyanate is preferably about 2.4 or greater, more preferably about 2.7 or greater, and most preferably about 3.0 or greater. The average number of isocyanate groups per molecule of polyisocyanate is preferably about 5.0 or less, more preferably about 4.0 or less, and most preferably about 3.5 or less. Preferably, the polyisocyanate comprises a mixture of polymethylene poly(phenyl isocyanate) and diphenylmethane diisocyanate.

The polymethylene poly(phenyl isocyanate) is present in an amount sufficient to impart the desired properties to the primer composition. Preferably, the polymethylene poly(phenyl isocyanate) is present in an amount of about 10 weight percent or greater, and more preferably about 20 weight percent or greater, based on the total weight of the polyisocyanate mixture. Preferably, the polymethylene poly(phenyl isocyanate) is present in an amount of about 30 weight percent or less, and more preferably about 25 weight percent or less, based on the total weight of the polyisocyanate mixture. Preferred polyisocyanates include PAF™ 20, PAPI™ 27, and PAPI ™ 580, sold by The Dow Chemical Company; Lupranate™ M200, sold by BASF Corporation Chemicals Division; and PBA-2257 and PBA-2262, sold by ICI. In addition, derivatives of 4,4'-diphenylmethane diisocyanate which are liquid at room temperature, such as polyisisocyanates which have carbodiimide groups in their backbone or mixtures thereof, may also be used. The preparation of these materials is disclosed in U.S. Pat. No. 3,152,162, which is hereby incorporated by reference. An example of a commercial material of this type is Isonate™ 143L Isocyanate, a product of The Dow Chemical Company.

The polyester resin and the polyisisocyanate are combined in a manner such that a primer composition is formed. The polyester resin and the polyisocyanate are combined in a manner such that the weight ratio of the polyester resin and the polyisocyanate is preferably about 0.25:1.0 or greater, more preferably about 0.33:1.0 or greater, and more preferably about 0.5:1.0 or greater. The polyester resin and the polyisocyanate are combined in a manner such that the weight ratio of the polyester resin and the polyisocyanate is preferably about 2.0:1.0 or less, more preferably about 1.5:1.0 or less, and more preferably about 1.0:1.0 or less.

The polyester resin and polyisocyanate are present in amounts which impart the desired adhesion characteristics to the primer composition. In the primer composition of the invention, the polyester resin preferably comprises about 5 weight percent or greater, more preferably about 7 weight percent or greater, and most preferably about 8 weight percent or greater, based on the total weight of the primer composition. The polyester resin preferably comprises about 18 weight percent or less, more preferably about 13 weight percent or less, and most preferably about 10 weight percent or less, based on the total weight of the primer composition. The polyisocyanate preferably comprises about 6 weight percent or greater, more preferably about 8 weight percent or greater, and most preferably about 10 weight percent or greater, based on the total weight of the primer composition. The polyisocyanate preferably comprises about 17 weight percent or less, more preferably about 15 weight percent or less, and most preferably about 13 weight percent or less, based on the total weight of the primer composition.

A catalyst is also included in the primer composition of the invention and is present in an amount which promotes the reaction of the polyisocyanate with atmospheric moisture and with active hydrogen groups present on the primed substrate. The catalyst also selectively catalyzes the isocyanate polyol reaction leading to a faster cure of the adhesive and link up to the primed surface. Therefore, the catalyst in the primer composition helps decreases the cure time of the adhesive on the substrate thereby shortening the drive away time. Preferably, the catalyst is present in an amount of about 0.1 weight percent or greater, more preferably about 0.5 weight percent or greater and most preferably about 2.0 weight percent or greater, based on the total weight of the primer composition. Preferably, the catalyst is present in an amount of about 5.0 weight percent or less, more preferably about 3.0 weight percent or less and most preferably about 2.5 weight percent or less, based on the total weight of the primer composition. Preferably, the catalyst is bismuth octoate.

The volatile solvent component of the primer composition of the invention may be any solvent which is anhydrous in order to prevent the isocyanate from reacting with any water present. The volatile solvent component is any solvent which will dissolve the polyester resin at a temperature in the range of from about 20° C. to about 50° C. Solvents useful in the invention are organic, polar, have low flash points and low solubility parameters, and are non-reactive with the isocyanate. Solvents useful in the invention include xylene, methylene chloride, benzene, monochlorobenzene, trichloroethylene, ethylene chloride, toluene, acetone methyl ethyl ketone, ethyl acetate and mixtures thereof. The solvent is preferably acetone or methyl ethyl ketone or a mixture thereof. The solvent is used in an amount that permits application of the primer composition to a substrate. The solvent is preferably used in an amount of about 50 weight percent or greater, more preferably about 55 weight percent or greater, and most preferably about 60 weight percent or greater, based on the total weight of the primer composition. The solvent is preferably used in an amount of about 90 weight percent or less, more preferably about 85 weight percent or less, and most preferably about 80 weight percent or less, based on the total weight of the primer composition.

Carbon black may also be added to the primer composition of the invention to modify the rheological properties of the primer composition, such as viscosity, sag resistance, and flow rate. When carbon black is used, it is preferably used in an amount of about 0.5 weight percent or greater, more preferably about 1.0 weight percent or greater, and most preferably about 2.0 weight percent or greater, based on the total weight of the primer composition. Carbon black is preferably used in an amount of about 5.0 weight percent or less, more preferably about 4.0 weight percent or less, and most preferably about 3.0 weight percent, based on the total weight of the primer composition.

Other fillers and additives which may also be used to modify the rheological properties of the primer composition include, for example, surface-treated fumed silicas, titanium dioxide, calcium carbonate, talc, defoaming agents, mica, aluminum oxide, clays, and glass phenolic or aluminum oxide bubbles. Such fillers and additives are preferably anhydrous, or dried before use in order to prevent the reaction of any moisture present with the isocyanate. When talc is added it is preferably used in an amount of about 3 weight percent or greater, and more preferably about 5 weight percent or greater, based on the total weight of the primer composition. Talc is preferably used in an amount of about 12 weight percent or greater, and more preferably about 9 weight percent or less, based on the total weight of the primer composition.

Additives which stabilize the free isocyanate groups present in the primer composition can also be used. Such additives include diethyl malonate and bentone. The additive is preferably present in an amount of about 0.02 weight percent or greater, more preferably about 0.10 weight percent or greater, and most preferably about 0.50 weight percent or greater, based on the total weight of the primer composition. The additive is preferably present in an amount of about 5.0 weight percent or less, more preferably about 2.5 weight percent or less, and most preferably about 1.5 weight percent or less, based on the total weight of the primer composition.

The above-described materials can be combined in any order and manner known to one skilled in the art to form a primer composition. In the preparation and storage of the primer composition, it is preferable to minimize the moisture content of the primer composition, so that the free isocyanate groups will not react with water. Additives which may be employed to reduce the free water content of the primer composition are molecular sieves which preferably have a pore diameter of about 3 Angstroms. Preferably, the molecular sieves are crystalline aluminosilicates and crystalline aluminophosphates. These molecular sieves are preferably added in an amount of about 0.01 weight percent or greater, and even more preferably about 0.03 weight percent, based on the total weight of the primer composition. These molecular sieves are preferably added in an amount of about 1.0 percent or less, and more preferably about 0.1 weight percent or less, based on the total weight of the primer composition.

The primer composition of the invention may be used to prime a substrate for use with any one component to two component adhesive by applying at least one coat of the primer composition to the substrate prior to the application of an adhesive. In preferred embodiments, the surfaces to which the primer and sealant are applied is cleaned prior to application. See, for example, U.S. Pat. No. 4,525,511, U.S. Pat. No. 3,707,521 and U.S. Pat. No. 3,779,794, relevant parts of all incorporated herein by reference. The surfaces can be cleaned by any method known to one skilled in the art. The surfaces should be dry, clean of dust and fingerprints, with no film residue or any other contamination. The primer composition of the invention is especially well adapted for use with a urethane adhesive, particularly a moisture-curable urethane adhesive, and more particularly a "fast cure" urethane adhesive comprised of an isocyanate-functional prepolymer and dimorpholinediethyl ether of the type which is described in U.S. Pat. No. 4,758,648 and 4,780,520, which are hereby incorporated by reference. Other urethane sealants which may be used with the primer composition of the invention include sealants of the type described in U.S. Pat. Nos. 3,707,521; 3,779,794; 4,624, 996; 4,625,012; 4,758,648 and 4,719,267, which are hereby incorporated by reference.

The time primer application to application of sealant is about 15 minutes.

Preferably, the cure time of the sealant from application to drive away is about 12 minutes or greater, more preferably about 30 minutes or greater, and most preferably about 60 minutes or greater. Preferably, the cure time of the sealant is about 240 minutes or less, more preferably about 180 minutes or less, and most preferably about 120 minutes or less.

The primer composition of the invention may be used to prime any type of substrate, but is especially well adapted for use with a painted substrate, such as a metal substrate painted with a paint system comprising a base coat of an enamel paint coated with a clear coat of a polyurethane or acrylic melamine or a monocoat of acrylic melamine high solids enamel.

ILLUSTRATIVE EMBODIMENTS

The following examples are given to illustrate the invention, but are not intended to limit the scope thereof. All parts and percentages are by weight unless otherwise indicated.

EXAMPLE 1

All weight percents are based on the total weight of the primer composition. Vitel™ PE-200 polyester resin (11.23 weight percent) and 39.8 weight percent of anhydrous methyl ethyl ketone (MEK) are charged into a ball mill which is rolled on a roller for about 30 minutes, or until the polyester resin is completely dissolved in the MEK. Bentone (1.05 weight percent), clay (10.01 weight percent), carbon black (2.63 weight percent), and a molecular sieve powder (0.02 weight percent) are added to the ball mill and ground for about 16 hours. PAPI™ 20 polyisocyanate (19.13 weight percent), anhydrous acetone (12.8 weight percent), diethyl malonate (0.29 weight percent), Dabco™ DC-2 urethane catalyst (0.39 weight percent), and bismuth octoate (2.5 weight percent) are added to the ball mill and ground for 1 hour, resulting in a primer composition.

What is claimed is:

1. A primer composition, comprising
   (a) a polyester resin of a carboxylic acid and a glycol;
   (b) a polymethylene poly(phenyl isocyanate), diphenylmethane diisocyanate or a mixture thereof; and
   (c) bismuth octoate
in a volatile solvent.

2. The primer composition of claim 1 wherein the weight ratio of (a) and (b) is from about 0.25:1.0 to 2.0:1.0.

3. The primer composition of claim 2 wherein the weight ratio of (a) and (b) is from about 0.33:1.0 to 1.5:1.0.

4. The primer composition of claim 3 wherein the bismuth octoate is present in an amount of about 0.1 weight percent to about 5 weight percent, based on the total weight of the primer composition.

5. The primer composition of claim 4 wherein the polyester resin is a polymer of at least one aromatic dicarboxylic acid or alkyl ester and at least one glycol compound.

6. The primer composition of claim 5 wherein the dicarboxylic acid is 1,3-benzenedicarboxylic acid, 1,4-benzenedicarboxylic acid or mixtures thereof, and the glycol is 1,2-ethanediol.

7. The primer composition of claim 6 wherein component (b) is a mixture of polymethylene poly(phenyl isocyanate) and diphenylmethane diisocyanate.

8. The primer composition of claim 7 wherein the volatile solvent is xylene, methylene chloride, benzene, monochlorobenzene, trichloroethylene, ethylene chloride, toluene, acetone, methyl ethyl ketone, ethyl acetate and mixtures thereof.

9. A primer composition, comprising:
   (a) 5–18 weight percent of a polyester resin of a carboxylic acid and a glycol;
   (b) 6–17 weight percent of a polymethylene poly(phenyl isocyanate), diphenylmethane diisocyanate or a mixture thereof; and
   (c) 0.5 to 2.5 weight percent of bismuth octoate
in a volatile solvent.

10. The primer composition of claim 8 wherein the weight percent of component (a) is about 7 weight percent to about 13 weight percent, based on the total weight of the primer composition.

11. The primer composition of claim 9 wherein the weight percent of component (b) is from about 8 to about 15 weight percent, based on the total weight of the primer composition.

12. The primer composition of claim 10 wherein the polyester resin is a polymer of at least one aromatic dicarboxylic acid or alkyl ester and at least one glycol compound.

13. The primer composition of claim 11 wherein the dicarboxylic acid is 1,3-benzenedicarboxylic acid, 1,4- benzenedicarboxylic acid or mixtures thereof, and the glycol is 1,2-ethanediol.

14. The primer composition of claim 12 wherein component (b) is a mixture of polymethylene poly(phenyl isocyanate) and diphenylmethane diisocyanate.

15. The primer composition of claim 13 wherein the volatile solvent is xylene, methylene chloride, benzene, monochlorobenzene, trichloroethylene, ethylene chloride, toluene, acetone, methyl ethyl ketone, and mixtures thereof.

* * * * *